(12) United States Patent
Kuzmin

(10) Patent No.: US 7,681,831 B2
(45) Date of Patent: Mar. 23, 2010

(54) SUSPENSION NET FOR AIRBORNE SURVEYING

(75) Inventor: Petr Valentinovich Kuzmin, Aurora (CA)

(73) Assignee: Geotech Airborne Limited, St. Michael (BB)

( * ) Notice: Subject to any disclaimer, the term of this patent is extended or adjusted under 35 U.S.C. 154(b) by 0 days.

(21) Appl. No.: 11/610,556

(22) Filed: Dec. 14, 2006

(65) Prior Publication Data
US 2008/0143130 A1  Jun. 19, 2008

(51) Int. Cl.
*G01V 3/16* (2006.01)

(52) U.S. Cl. .................. 244/1 TD; 324/330; 324/331; 324/334; 324/335

(58) Field of Classification Search .............. 244/1 TD, 244/137.4; 324/330, 331, 334, 335
See application file for complete search history.

(56) References Cited

U.S. PATENT DOCUMENTS

| 3,084,966 | A | * | 4/1963 | Higgins | 294/77 |
| 4,159,840 | A | | 7/1979 | Fengels | |
| 4,628,266 | A | | 12/1986 | Dzwinel | |
| 4,641,100 | A | * | 2/1987 | Dzwinel | 324/330 |
| 7,157,914 | B2 | * | 1/2007 | Morrison et al. | 324/330 |
| 2005/0001622 | A1 | | 1/2005 | Morrison et al. | |

FOREIGN PATENT DOCUMENTS

WO  2005106536  11/2005

* cited by examiner

*Primary Examiner*—J. Woodrow Eldred
(74) *Attorney, Agent, or Firm*—Novak Druce and Quigg LLP

(57) ABSTRACT

A suspension net is provided for distributing tension forces from a tow rope to an electromagnetic bird used for geophysical surveying. The suspension net allows large transmitter loop sizes, and the net structure generally avoids rope confusions that can occur during lift-up.

18 Claims, 2 Drawing Sheets

SUSPENSION NET FOR AIRBORNE SURVEYING

FIELD OF THE INVENTION

This invention relates in general to the field of airborne geophysical surveying. This invention further relates to an apparatus for conducting geophysical surveying using an electromagnetic method.

BACKGROUND OF THE INVENTION

Airborne electromagnetic surveying has been a widely used method for obtaining geophysical information. Electromagnetic surveying was originally designed for the exploration of conductive ore bodies buried in resistive bedrock, but at the present time it is also used extensively in general geological mapping, in hydrogeology, in environmental investigations, etc. Known methods utilize electromagnetic conductivity techniques to measure the apparent conductivity of the earth by applying an artificial alternating magnetic field. In essence, these techniques employ a transmitter to radiate a primary electromagnetic field, which in turn induces eddy currents in underground conductors. These eddy currents induce a secondary electromagnetic field that is then observed by an electromagnetic sensor (such as a receiver coil). This data is then used to compute geophysical information in a manner that is known.

The two basic types of electromagnetic techniques are frequency domain electromagnetic (FDEM) surveying and time domain electromagnetic (TDEM) surveying. FDEM measures the electrical response of the underground conductors at different frequencies to record the variations of conductivity with depth. TDEM, on the other hand, measures the electrical response of the underground conductors to a periodic magnetic pulse. For either method, the secondary fields are measured and used for mapping and geological interpretation in a manner that is known.

Although these electromagnetic techniques encompass both ground and airborne applications, airborne systems are preferred if the speed of the surveying is important.

The common technical means to generate magnetic field pulses is a known transmitter generally consisting of a loop of wire or a multi-turn coil connected to the output of a known electrical current generator or transmitter driver. The typical size of a transmitter coil is up to a few meters in diameter for an airborne device and up to hundreds of meters for ground systems. Generally, the bigger the transmitter coil diameter the stronger its magnetic moment, which then results in deeper and more accurate investigations. An additional multi-turn coil or an x-y-z coil system usually serves as a receiver or sensor for the secondary electromagnetic field. Magnetometers are also applicable for this purpose. In contemporary systems, received signals are digitised by a known analog to digital converter (ADC) and processed and stored by computer.

In one type of electromagnetic bird, the transmitter loop is rigidly mounted inside the bird body along its perimeter and the electromagnetic sensor is mounted inside the bird body in its center. This sensor receives both the primary electromagnetic field of the transmitter loop and secondary electromagnetic fields of eddy currents induced in the underground conductors. The primary signal component, being generally constant, can be thus subtracted from the received signal using known compensating coils or electronic circuits.

One significant technical problem for these airborne systems of this type is that any mechanical deformations of the transmitter loop can change its magnetic field, and therefore induce signals in the electromagnetic sensor. It is virtually impossible to distinguish such changes from electromagnetic anomalies received from the underground conductors. For this reason, it is important to minimize the bird deformations during the survey flight. Another difficulty encountered with such systems is mechanical management in start/landing and in flight manoeuvres.

An example of airborne electromagnetic birds technology is that used in the AEROTEM™ branded solution of Aeroquest Ltd. The suspension system consists of a tow cable and three ropes, which are attached to the rigid and relatively heavy structure of EM bird at three different points. The primary disadvantage of this method of suspension is the deformation that occurs between the three suspension points in the case of vertical accelerations of the helicopter. As discussed, such deformations can serve to significantly distort the electromagnetic signal during measurements. Such three point suspension systems also may limit the bird size and weight because long distances between suspension points can cause instability and, in the worst scenario, result in breakage of the bird structure.

There are other suspension systems consisting of the tow cable and more than three ropes attached to the electromagnetic EM bird having some flexibility in the suspension points. An example of this configuration is described in U.S. Patent Application No. 20050001622. The primary disadvantage of this type of suspension system is that structural deformation can occur as a result in the change of rope length and flexing in oncoming wind conditions, causing deformations of the bird structure and consequently potentially comprising the integrity of the survey data.

Other common configurations for suspension systems exist, including one- and two-point suspensions. These are typically used only for small towed birds, such as for FDEM or electromagnetic birds containing sensors only. An example of these suspension techniques is found in the GEOTEM™ and MEGATEM™ TDEM systems (Fugro Airborne Surveys Ltd.), or the helicopter towed system manufactured by T.H.E.M Geophysics Inc. These one- or two-point suspension configurations possess the same shortcomings as described for the other suspension methods, namely that they do not provide adequate mechanical stability for larger birds.

On the basis of the foregoing, there is a need for a net suspension apparatus that provides a uniform distribution of tension forces from the aircraft to the electromagnetic bird body, thus minimizing possible deformations and optimizing the quality of the surveying data.

SUMMARY OF THE INVENTION

The present invention is a suspension net for use with a towed geophysical electromagnetic bird.

In one aspect of the present invention, the suspension net is a net structure consisting of rows of cells formed from ropes. The structure distributes tension forces in a substantially homogenous manner from the tow cable to the electromagnetic bird and thus minimizes mechanical deformations of the rigid electromagnetic bird body while in tow.

In another aspect of the present invention, the suspension net comprises ropes having pre-calculated lengths. Calculations are preferably performed using a custom software program, in a manner that is known.

The support characteristics of the suspension net allow for large transmitter loop sizes, which generally mean greater power for geophysical surveying, without exceeding the carrying capacity of a towing aircraft. As well, the interwoven nature of the net structure generally avoids rope confusions that can occur during starting lift-up.

BRIEF DESCRIPTION OF THE DRAWINGS

A detailed description of the preferred embodiment(s) is(are) provided herein below by way of example only and with reference to the following drawings, in which.

Figure 1A:
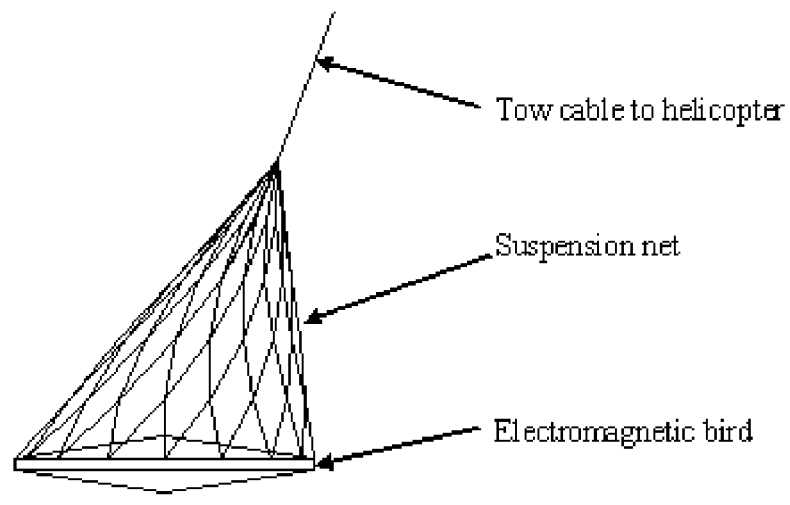
FIG. 1A and FIG. 1B illustrate a suspension net from a side view and a bottom view, respectively.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PRESENT INVENTION

In geophysical surveying, an electromagnetic bird normally comprises a frame structure with a rigidly placed transmitter loop and electromagnetic sensors (receiver coils). Typically, the transmitter loop is rigidly mounted inside the bird body along its perimeter. Alternating electrical current is passed through the transmitter loop, generating alternating magnetic fields and inducing eddy-currents in underground conductors. There is also an electromagnetic sensor mounted inside the bird body in its center. This sensor receives both the primary electromagnetic field of the transmitter loop and secondary electromagnetic fields of eddy currents induced in the underground conductors. Thus, the constant component of the primary signal can be subtracted from the received signal using compensating coils or electrical circuits used in common practice in geophysical surveying. When the bird is towed over local underground conductors, the secondary electromagnetic field changes, changing the signal level in the sensor.

To ensure optimal data, it is important to distinguish between the signals originating from the transmitter loop and the signals originating from the underground conductors. This distinction is only possible if the frame of the bird is rigid and there are no significant deformations of its structure during the flight. Any changes or mechanical deformations in the shape of the transmitter loop results either in a change of the distance between the loop and the sensor or change in its vector direction. This therefore results in a change in the measured data (through the electromagnetic sensor) that can not generally be differentiated from the electromagnetic anomalies corresponding with the underground conductor measurements. For this reason, it is important to minimize the bird deformations during the survey flight. A rigid frame of the bird allows for the primary electromagnetic field measured by the sensor to be constant so that all signal changes are a result of a presence of underground conductors.

As mentioned, tow suspensions that are currently used consist of a set of ropes that do not provide sufficient structural rigidity because the ropes can fluctuate in length and/or bow or arch so that the mechanical tension forces are not uniformly distributed to the contact points with the bird frame, causing bird frame deformations. Or, alternatively, bird frames can be structurally rigid themselves, but these are generally limited in size because the added rigidity means an increase in weight.

The present invention provides a suspension net generally for a geophysical electromagnetic bird. The suspension net is attached to a tow rope (attached to an aircraft) on one end and to the bird on another end. The suspension net distributes tension forces substantially uniformly around the bird body, thus minimizing possible deformations.

Figure 1B:
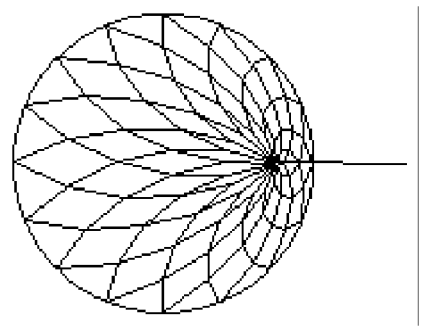

A suspension net is illustrated in FIG. 1A, shown from a side view. FIG. 1B illustrates a bottom view. In this case, the electromagnetic bird has rigid body with a disk shape with a round perimeter 20 m in diameter and with a weight of approximately 400 kg, for example.

Although a round perimeter is described, it should be understood that the present invention is compatible with an electromagnetic bird having any shape, for example, having a perimeter that is polygonal or elliptical. Further, although the term "perimeter" may be used herein to describe the region on the electromagnetic bird where the electromagnetic bird attaches to the suspension net, it should be understood that it is not essential that the suspension net attaches to the exact perimeter of the electromagnetic bird. The suspension net provides homogenous support to the sensor loop, and this may be achieved even if the suspension net is not attached to the electromagnetic bird around its perimeter.

According to this particular embodiment, the suspension net has a conical shape and consists of rows of geometrically arranged cells (in this case the cells are quadrilaterals, but other shapes are of course possible) organized into levels, with the upper level attached to the tow cable, and the lower level attached to the structure of the electromagnetic bird. Although the term "conical" may be used herein to describe the shape of the suspension net, it should be understood that this term is not meant to limit the scope of the present invention, and is only used herein as a rough description of the shape of suspension net according to an embodiment.

The forward-oriented cells (in terms of position when in-tow) are generally smaller in size than rear-oriented cells. As a result, the top of the net cone is positioned not above the bird centre but shifted forward. During flight, the oncoming air stream pushes the suspended system backward from the aircraft, but the non-centred net provides for a horizontal attitude of the bird body in the air stream. The ropes can be fashioned from any materials but preferably materials having good tensile properties, for example, organic fibre, nylon, polyester, SPECTRUM™, KEVLAR™, or ENDURA™. Ropes are fastened to one another by simple knotting, although the present invention contemplates any other suitable method of fastening.

The electromagnetic bird body is attached to the suspension net in 16 attachment points around its external perimeter, as an example. The number of attachment points will vary depending on various factors. Generally speaking, the larger and heavier the bird is, the greater number of attachment points that are required to keep deformations in the acceptable range, as would be readily appreciated by a person of skill in the art. This consideration is balanced with the net increase in air drag and there should be a compromise determined by experimental flight with different nets for each particular bird design, depending particularly on the bird size, shape and weight. The number of attachment points will also dictate the number of rope connection points that are positioned at every level between the bird and the tow rope.

According to this embodiment, the net consists of four levels of quadrilateral cells. The number of rows will also vary depending on various factors, e.g., the net height. For most applications, four to seven levels of cells for the suspension net are suitable. As mentioned, each level is defined by a series of rope connection points. The levels span the total net height, for example, 20 m. The top of the net is shifted according to a tilt angle, for example, the top of the net is shifted 8 m forward from the bird center. The tilt angle can be altered and/or optimized depending on the weight of the bird, the wind resistance of the bird and net configuration (i.e. the diameter of the ropes), and the flight speed of the aircraft.

In an aspect of the present invention, the suspension net has cells with dimensions that are pre-calculated so that the entire net has the desired shape, and is operable to provide a horizontal spatial attitude of the particular electromagnetic bird in the oncoming air stream during the flight with a normal survey speed of approximately 90 km/h, for example. In particular, software can be used to calculate the individual rope lengths for the plurality of ropes that form the suspension net. Each rope can be indexed according to a numbering system. The desired net height can be divided roughly equally into the desired number of levels. (It is not essential that the levels be of equal height, but this generally simplifies the calculations.)

The desired number of attachment points then establishes the number of individual cells (formed by four ropes, or formed by two ropes and the electromagnetic bird for the row directly adjacent the electromagnetic bird). In the case of a circular bird, the attachment points are preferable positioned around the perimeter of the bird at approximately equal distances from one another. The attachment points also dictate the number of rope connection points for each level. The rope connection points define a level diameter for each level, with the level diameter decreasing in size the closer the further the level is from the bird, i.e. the closer the level is to the tow rope.

In a further aspect of the present invention, the rope length calculations can include a separate step in order to generate a "squeezed" appearance for the conical structure. According to this aspect, the level diameters for the middle levels are decreased in size by a desired factor. As a result, the suspension net resembles other types of conical or cylindrical nets which have a squeezed inward shape caused by the effect of mechanical tension forces on the net cells (seen, for example, with basketball nets and cargo nets).

Using known simple trigonometric ratios, the software program can calculate the length of each individual rope according to: (i) the diameter and shape of the electromagnetic bird; (ii) the desired net height; (iii) the desired tilt angle (measured from the centre of the bird to the tow rope); (iv) the number of desired levels; (v) the height of the desired levels (if they are not equal); and (vi) the number of desired attachment points. Once the lengths are known, the suspension net can be readily fabricated.

For example, the calculations required for fabricating a suspension net structure in accordance with the present invention can be implemented in a custom software application created using C++™ programming language, in a manner that is known. It is not essential of course that the calculations are performed by software, but software is the preferred means.

The suspension net of the present invention should be understood as a means of distributing tension forces substantially homogeneously around the perimeter of an electromagnetic bird, since any length changes or arcing of the ropes will cause deformations of the net cells, not of the bird. The support characteristics of the suspension net allow for larger possible transmitter loop sizes, which mean greater power for geophysical surveying, generally without exceeding the carrying capacity of the towing helicopter. An additional advantage is that the interwoven nature of the net structure generally avoids rope confusions that can occur during starting lift-up.

It will be appreciated by those skilled in the art that other variations of the preferred embodiment may also be practised without departing from the scope of the invention. Further illustration of the present invention is provided in the following examples.

Example 1

Figure 2A:
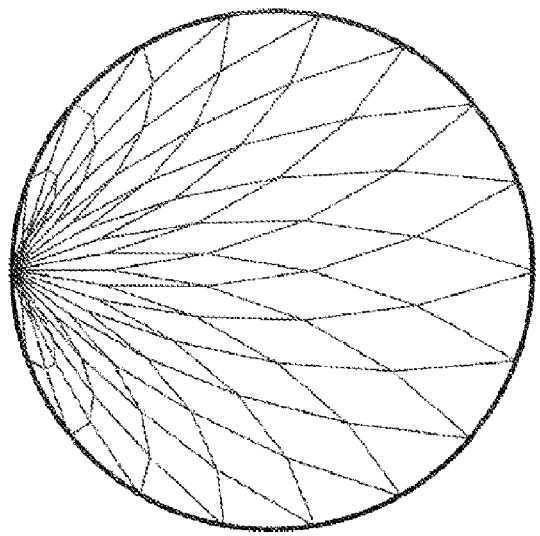
FIG. 2A and FIG. 2B illustrate a particular geometric configuration for a suspension net from a side view and a bottom view, respectively.
Figure 2B:
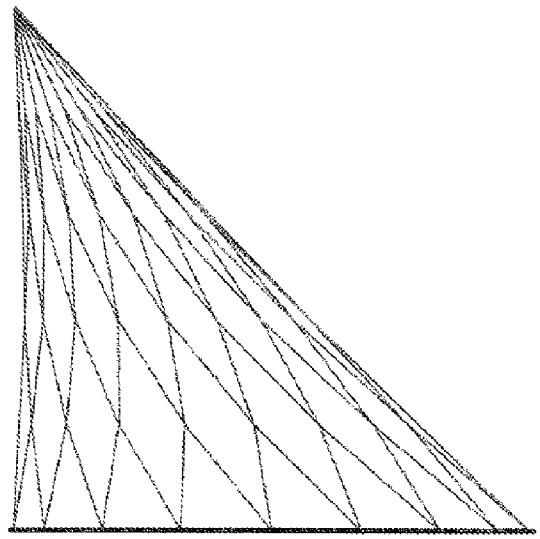

Table 1 below provides rope lengths calculated in the manner described above. The resulting geometric configuration is depicted in FIG. 2A and FIG. 2B. The calculations were carried out using a custom software application. The parameters were: a diameter of 40.0; a tilt angle of 26.50°; a net height of 45.0; 18 attachment points; and 5 levels, with the level height the same for each level.

"L1" indicates the first level which is adjacent to the circular bird perimeter; "L2" indicates the second level, etc. The rope numbers refer to adjacent ropes moving around the perimeter of the bird or the diameter of each level. The same number of ropes and the same number of rope connection points are present are present on each level.

TABLE 1

Rope lengths for a suspension net with 5 levels.

| Rope Number | Rope Length | | | | |
|---|---|---|---|---|---|
| | L1 | L2 | L3 | L4 | L5 |
| 01, 36 | 12.32 | 11.66 | 11.42 | 11.12 | 11.05 |
| 02, 35 | 11.93 | 11.89 | 11.19 | 11.20 | 10.97 |
| 03, 34 | 12.52 | 11.26 | 11.49 | 10.89 | 10.97 |
| 04, 33 | 11.35 | 11.93 | 10.80 | 11.11 | 10.74 |
| 05, 32 | 12.50 | 10.71 | 11.38 | 10.51 | 10.74 |
| 06, 31 | 10.66 | 11.77 | 10.29 | 10.87 | 10.38 |
| 07, 30 | 12.27 | 10.08 | 11.10 | 10.03 | 10.36 |
| 08, 29 | 9.91 | 11.43 | 9.70 | 10.49 | 9.93 |
| 09, 28 | 11.84 | 9.41 | 10.67 | 9.50 | 9.93 |
| 10, 27 | 9.19 | 10.93 | 9.11 | 10.01 | 9.41 |
| 11, 26 | 11.25 | 8.80 | 10.14 | 8.96 | 9.41 |
| 12, 25 | 8.61 | 10.32 | 8.59 | 9.47 | 8.91 |
| 13, 24 | 10.54 | 8.33 | 9.55 | 8.50 | 8.91 |
| 14, 23 | 8.26 | 9.66 | 8.21 | 8.93 | 8.47 |
| 15, 22 | 9.78 | 8.11 | 8.97 | 8.18 | 8.47 |
| 16, 21 | 8.24 | 9.01 | 8.06 | 8.47 | 8.17 |
| 17, 20 | 9.08 | 8.16 | 8.47 | 8.06 | 8.17 |
| 18, 19 | 8.53 | 8.48 | 8.15 | 8.16 | 8.07 |

Example 2

Figure 3A:
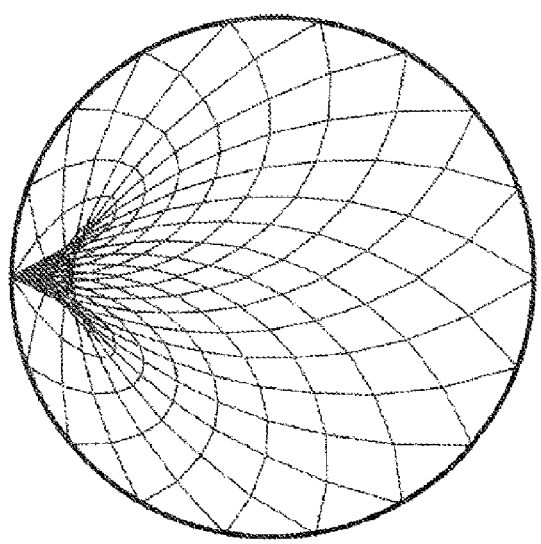
FIG. 3A and FIG. 3B illustrate another particular geometric configuration for a suspension net from a side view and a bottom view, respectively.
Figure 3B:
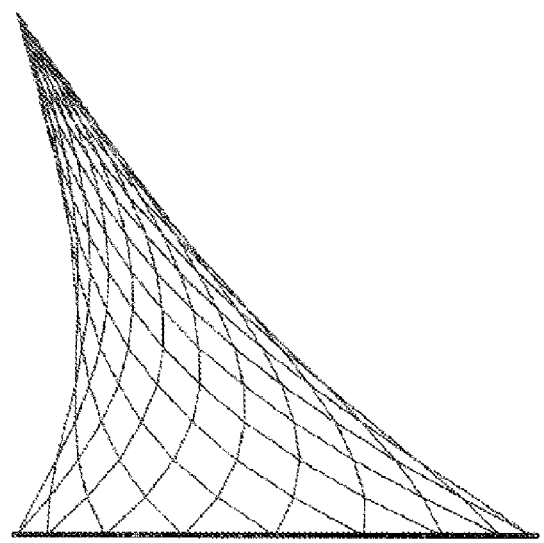

Table 2 lists the rope lengths for another suspension net. The parameters in this case were a diameter of 40.0, a tilt angle of 26.50°, a net height of 45.0, 18 attachment points, and 14 levels, as shown in FIG. 3A and FIG. 3B. In this example, the middle levels were reduced in diameter to give the conical shape a "squeezed" appearance, as described above.

TABLE 2

Rope lengths for a suspension net with 14 levels.

| Rope Number | L1 | L2 | L3 | L4 | L5 | L6 | L7 | L8 | L9 | L10 | L11 | L12 | L13 | L14 |
|---|---|---|---|---|---|---|---|---|---|---|---|---|---|---|
| 01, 36 | 6.43 | 5.67 | 5.28 | 4.77 | 4.54 | 4.20 | 4.07 | 3.86 | 3.79 | 3.66 | 3.63 | 3.56 | 3.65 | 3.53 |
| 02, 35 | 6.15 | 5.88 | 5.04 | 4.94 | 4.35 | 4.34 | 3.93 | 3.96 | 3.69 | 3.73 | 3.57 | 3.59 | 3.52 | 3.53 |
| 03, 34 | 6.60 | 5.38 | 5.42 | 4.52 | 4.65 | 4.01 | 4.16 | 3.72 | 3.85 | 3.56 | 3.86 | 3.50 | 3.55 | 3.50 |
| 04, 33 | 5.79 | 5.99 | 4.74 | 5.03 | 4.10 | 4.40 | 3.74 | 4.00 | 3.56 | 3.74 | 3.47 | 3.59 | 3.46 | 3.50 |
| 05, 32 | 6.66 | 5.02 | 5.47 | 4.22 | 4.69 | 3.77 | 4.18 | 3.54 | 3.85 | 3.44 | 3.64 | 3.41 | 3.51 | 3.44 |
| 06, 31 | 5.39 | 5.99 | 4.39 | 5.02 | 3.82 | 4.39 | 3.52 | 3.98 | 3.72 | 3.39 | 4.36 | 3.55 | 3.38 | 3.44 |
| 07, 30 | 6.59 | 4.62 | 5.41 | 3.89 | 4.64 | 3.51 | 4.13 | 3.35 | 3.61 | 3.29 | 3.59 | 3.31 | 3.45 | 3.36 |
| 08, 29 | 4.97 | 5.87 | 4.03 | 4.92 | 3.52 | 4.30 | 3.30 | 3.91 | 3.23 | 3.65 | 3.23 | 3.48 | 3.28 | 3.36 |
| 09, 28 | 6.42 | 4.25 | 5.26 | 3.58 | 4.50 | 3.28 | 4.02 | 3.16 | 3.71 | 3.16 | 3.51 | 3.20 | 3.37 | 3.27 |
| 10, 27 | 4.61 | 5.66 | 3.70 | 4.74 | 3.26 | 4.15 | 3.10 | 3.78 | 3.07 | 3.55 | 3.11 | 3.39 | 3.18 | 3.27 |
| 11, 26 | 6.14 | 3.95 | 5.01 | 3.32 | 4.30 | 3.06 | 3.86 | 3.00 | 3.58 | 3.03 | 3.40 | 3.10 | 3.28 | 3.18 |
| 12, 25 | 4.35 | 5.35 | 3.47 | 4.48 | 3.07 | 3.94 | 2.95 | 3.62 | 2.96 | 3.41 | 3.02 | 3.28 | 3.09 | 3.18 |
| 13, 24 | 5.78 | 3.77 | 4.70 | 3.17 | 4.05 | 2.94 | 3.65 | 2.90 | 3.42 | 2.95 | 3.28 | 3.02 | 3.16 | 3.10 |
| 14, 23 | 4.25 | 4.99 | 3.38 | 4.17 | 3.00 | 3.70 | 2.88 | 3.43 | 2.90 | 3.27 | 2.96 | 3.17 | 3.03 | 3.10 |
| 15, 22 | 5.37 | 3.76 | 4.35 | 3.16 | 3.76 | 2.92 | 3.43 | 2.88 | 3.26 | 2.92 | 3.16 | 2.97 | 3.09 | 3.03 |
| 16, 21 | 4.34 | 4.60 | 3.46 | 3.85 | 3.05 | 3.44 | 2.91 | 3.23 | 2.90 | 3.13 | 2.94 | 3.07 | 2.99 | 3.03 |
| 17, 20 | 4.95 | 3.93 | 3.99 | 3.29 | 3.47 | 3.02 | 3.21 | 2.94 | 3.10 | 2.94 | 3.05 | 2.97 | 3.02 | 3.00 |
| 18, 19 | 4.59 | 4.22 | 3.67 | 3.53 | 3.22 | 3.20 | 3.03 | 3.06 | 2.98 | 3.02 | 2.97 | 3.00 | 2.99 | 3.00 |

What is claimed is:

1. An apparatus for airborne surveying comprising:
   (a) a suspension net having a tow rope connection point at an upper end thereof operable to attach to an aircraft, the suspension net having a plurality of ropes defining a downward opening substantially conical net structure by means of a plurality of attachment points between the plurality of ropes; and
   (b) a device used for acquiring surveying data, the device including a frame structure forming a loop and supporting one or more sensors
   wherein the suspension net having a lower end attached at multiple spaced apart attachment points about a perimeter of the frame structure and being configured to support the frame structure substantially uniformly about the perimeter of the frame structure during flight.

2. The apparatus of claim 1 wherein the device is an electromagnetic bird.

3. The apparatus of claim 2 wherein the suspension net is operable to maintain the electromagnetic bird in a substantially horizontal position when in flight.

4. The apparatus of claim 2 wherein the electromagnetic bird includes at least one transmission coil and at least one receiving coil.

5. The apparatus of claim 1 wherein the suspension net is formed of cells.

6. The apparatus of claim 5 wherein the cells of the suspension net are of different sizes such that the frame structure is operable to be positioned substantially horizontally according to a tilt angle when in flight.

7. A method of fabricating a suspension net for supporting an electromagnetic bird for airborne surveying that comprises a loop-like frame structure, the suspension net being substantially conical in shape and comprising a plurality of horizontally arranged cell levels each formed from a row of rope-defined cells, the method comprising:
   (a) defining a net structure for airborne surveying operable to connect at a lower end thereof to the electromagnetic bird and at an upper end thereof to a tow cable and operable to uniformly distribute tension forces from the tow cable uniformly about a perimeter of the frame structure and to maintain the frame structure substantially in a horizontal position provide a horizontal spatial attitude of the electromagnetic bird in flight, including by way of the additional steps of:
      (i) identifying the diameter and shape of the frame structure of the electromagnetic bird;
      (ii) identifying the height of the net structure from the lower end to the upper end for airborne surveying and;
      (iii) identifying a vertical tilt angle as measured from a center of the frame structure to a point at which the upper end of the net structure connects to the tow cable; and
      (iv) in accordance with the identified diameter and shape of the frame structure, electromagnetic bird, the identified height of the net structure for airborne surveying and the identified tilt angle defining the net structure by way of the additional steps of:
      1. calculating the number of cell levels and a size of the cells within each cell level to achieve the identified height and tilt angle and; 2. calculating a height of cell levels to support the frame structure of the electromagnetic bird; and
      2. calculating the number of attachment points between the lower end of the net structure and the electromagnetic bird; and
   (b) calculating rope lengths required to build to facilitate the creation of the defined net structure and cutting ropes to the calculated rope lengths; and
   (c) fastening the ropes together according to the rope lengths to create provide the defined net structure;
   wherein the suspension net is operable to distribute tension forces from a tow rope to the electromagnetic bird during airborne surveying, and to maintain the
   electromagnetic bird in a substantially horizontal position during flight.

8. An apparatus for airborne surveying, comprising:
   a frame structure forming a loop and supporting a conductive coil;
   a suspension net having an upper end and a lower end and formed from a plurality of rows of rope cells with an upper row at the upper end attached to a tow cable for connection to a towing aircraft and a lower row at the lower end attached at multiple spaced apart attachment points about a perimeter of the frame structure, the suspension net having a substantially conical shape opening towards the lower end and being configured to support the frame structure substantially uniformly about the perimeter of the frame structure during flight.

9. The apparatus of claim 8 wherein the suspension net has a forward side and a trailing side relative to an intended flight direction of the suspension net, at least some of the rope cells at the forward side being generally smaller in size than at least some of the rope cells at the trailing side with the upper end of the suspension net being located forward of a center of the frame structure during flight.

10. The apparatus of claim 8 wherein the circumferences of the rows of rope cells decrease non-linearly from the lower end to the upper end providing the suspension net with an inwardly squeezed profile at a region between the lower and upper ends.

11. The apparatus of claim 8 wherein the sizes of the rope cells are different throughout the suspension net to support the frame structure in a substantially horizontal orientation during airborne surveying.

12. The apparatus of claim 8 wherein the rope cells include quadrilateral cells.

13. The apparatus of claim 8 wherein a plurality of ropes are connected by knots to form the rope cells.

14. The apparatus of claim 8 wherein the number of rows of rope cells is 4 to 15.

15. The apparatus of claim 8 wherein the attachment points are equally spaced.

16. The apparatus of claim 8 wherein the conductive coil is a transmitter coil.

17. The apparatus of claim 8 wherein frame structure supports a receiver sensor.

18. The apparatus of claim 8 wherein the frame structure has a shape that is circular, polygonal, or elliptical.

\* \* \* \* \*